Patented Feb. 6, 1934

1,945,521

UNITED STATES PATENT OFFICE 1,945,521

MOTOR FUEL STABILIZATION

Frederick B. Downing, Carneys Point, N. J., and Herbert W. Walker, Wilmington, Del., assignors to E. I. du Pont de Nemours & Company, Wilmington, Del., a corporation of Delaware No Drawing. Application July 31, 1930
Serial No. 472,187

15 Claims. (Cl. 44—9)

This invention relates to improvement in means for the stabilization of mineral hydrocarbon products. More particularly it relates to the utilization of organic compounds as addition products for substances of the class named.

Liquid hydrocarbons as commercially produced, possess a tendency to discolor and to form gum, sludge and resinous substances.

Gasolines, for example, as produced by the modern cracking processes are extremely complicated mixtures comprising many constituents. The character of these constituents and the relative proportions of each depend upon the source of the crude petroleum and the particular cracking process employed. Ordinarily substantial percentages of unsaturated aliphatic and aromatic hydrocarbons are present. In certain instances these percentages are intentionally increased by the addition of unsaturated compounds to gasolines. Such additions may also be made to gasolines not containing unsaturated hydrocarbons. Regardless of how produced, gasolines containing these unsaturated compounds form, in the presence of air, a series of products some of which are resinous or gummy. These gums or resins tend to discolor the gasoline and form sticky substances which deposit on the walls and bottom of the container in which the gasolines are stored. Certain portions of the gums formed may be soluble in the gasoline but are objectionable because of the consequent introduction of non-volatile components into the gasoline.

Similar problems or disadvantages are met with motor benzol which is the name applied to a material similar to gasoline in physical properties but which consists largely of aromatic or unsaturated hydrocarbon compounds.

In transformer oil such as used in the electrical industry, these materials are detrimental in that a sludge tends to form in the transformer oil container and interferes with the satisfactory operation of such apparatus.

In the past it has been necessary to treat the crude products resulting from the more recent oil treating processes in some manner to remove the greater part of these unsaturated products or else add to the oil body some material capable of preventing or retarding formation of detrimental gums, resins and sludges.

This invention has for an object the inhibition of the formation of insoluble gums and resins in mineral oils, with an attendant improvement in the quality of the hydrocarbon and freedom from the difficulties introduced by the formation of the more or less insoluble and sticky, gummy material, such as irregular flow in the fuel system of internal combustion engines. A further object is to make it possible to use as an internal combustion fuel, liquid hydrocarbons such gasoline, that contain larger amounts of unsaturated compounds than commercially used at present. Still further objects are to produce a product of this sort at a lower cost, and one which possesses in certain cases, improved anti-knock properties. Other objects will appear hereinafter.

These objects are accomplished by the present invention whereby poly-straight-chain-alkyl-hydroxy-aryl-compounds are added to gasoline or oils having similar characteristics. The incorporation may be made at any suitable stage of the production of the substance to be stabilized. The invention includes compounds of the general formula

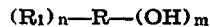
$$(R_1)_n—R—(OH)_m$$

wherein R is an aryl radical for example the radical of an aromatic hydrocarbon such as benzene, naphthalene or anthracene, $R_1$ is a straight-chain-alkyl radical, $m$ is an integer equal to or greater than 1, $n$ is an integer equal to or greater than 2 and in which the groups represented by $(R_1)_n$ may be alike or different. The invention will be readily understood from a consideration of the examples which follow.

One of the tests used for evaluating the effectiveness of this class of compounds as stabilizers or gum inhibitors is the accelerated oxygen test. Twenty-five (25) cc. of motor fuel, cracked gasoline, motor benzol, or the like, treated with 0.001 to 1% of the stabilizing agent are heated at 100° C., in an atmosphere of oxygen for 3 to 5 hours. The gum formed is measured by evaporating the hydrocarbon after the oxygen test from a porcelain dish in the steam oven. The extent of gum formation during the accelerated oxygen test is a measure of the stability and gumming tendency of the fuel during the long time storage.

*Example I*

When 0.03% 4-hydroxy-1:3-di-methyl-benzene was added to a freshly distilled cracked gasoline and 25 cc. were subjected to the accelerated oxygen test for 3½ hours, the amount of gum formed was 5 mg. An equal portion of the same gasoline containing no stabilizer tested in the same way at the same time gave 347 mg., of gum.

Example II

The mixed ortho and para xylenols or hydroxy di-methyl benzols obtained by diazotizing and hydrolyzing mixed ortho and para xylidines (which are in turn produced from mixed xylenes) were added to cracked gasoline to the extent of 0.03%. A 25 cc. portion of the treated gasoline, by the accelerated oxygen test in 5 hours, gave 43 mg., of gum, whereas a sample of the same gasoline without treatment for stability under the same conditions gave 370 mg., of gum.

Example III

In a 25 cc., portion of crude motor benzol 519 mg., of gum were deposited during an accelerated oxygen test carried out for seven hours. When 0.03% of the mixed ortho and para xylenols from mixed ortho and para xylidines were added to the crude motor benzol only 51 mg. of gum were formed during a seven hour accelerated oxygen test.

Example IV

In a 25 cc. portion of cracked gasoline containing 4-hydroxy-1:2-di-methyl-benzene in a concentration of 0.03%, 95 mg., of gum were formed by the accelerated oxygen test in four hours. A control or untreated sample in the same length of time gave 336 mg., of gum.

Example V

Another 25 cc. portion of the gasoline used in Example IV but containing 2-hydroxy-1:4-di-methyl-benzene was treated as set out in Example IV the gum formation mounted to 58 mg.

Example VI

Another 25 cc. portion of the gasoline of Examples IV and V but containing 2-hydroxy-1:3-di-methyl-benzene was similarly treated with the formation of 159 mg., of gum.

It is not desired to limit the invention to the concentration of the stabilizing agents given in the above examples. Use may be made of higher or lower concentrations of any members of the class of compounds represented by the general formula and as a result thereof greater or less inhibition of gum formation secured depending upon the specific agent used, the concentration of the agent, the nature of the material treated and the conditions under which the treatment and subsequent storage take place. The preferred actual concentration of the stabilizing agent may vary between the limits of 0.001 to 1.0%. It will be apparent, however, that this range is not given as limiting since lesser or greater amounts may be used in specific instances within the scope of the invention. In most instances no marked advantage is gained by using more than the maximum amount set out above. In any event the range given appears to be sufficient for the grades of gasoline and similar oils now on the market.

In general all mineral hydrocarbons may be treated. As specific examples, mention may be made of transformer oils, heavy motor oils such as are used in Diesel engines, motor benzol and gasolines. The invention is not limited to the specific stabilizing compounds set out in the above examples. In the general class of poly-straight-chain-alkyl- hydroxy - aryl - compounds mentioned above, several sub-classes of compounds merit special mention, for example, the following:

Di-alkyl-hydroxy-aryl compounds

A—Di-alkyl-hydroxy benzenes
  I—Di-alkyl-mono-hydroxy-benzenes
    a—Di-methyl-phenols
      (1) 1:3-di-methyl-4-hydroxy-benzene

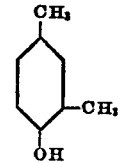

(2) 1:2-di-methyl-4-hydroxy-benzene

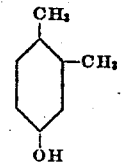

(3) 1:3-di-methyl-2-hydroxy-benzene

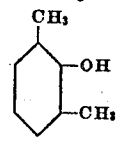

(4) 1:3-di-methyl-5-hydroxy-benzene

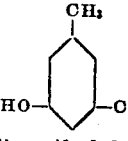

(5) 1:4-di-methyl-2-hydroxy-benzene

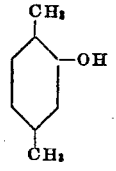

b—Di-ethyl-phenols
      (6) 1:3-di-ethyl-5-hydroxy-benzene

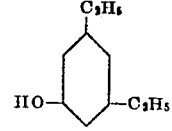

c—Methyl-ethyl-phenols
      (7) 1-methyl-4-ethyl-2-hydroxy - b e n-zene

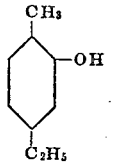

—Methyl-propyl-phenols
      (8) 1-Methyl-4-propyl-2-hydroxy-b e n-zene

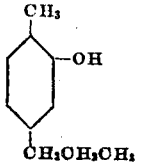

II—Di-alkyl-di-hydroxy-benzenes
 a—Di-methyl-di-hydroxy-benzenes
  (9)  1:2-di-methyl-3:6-di-hydroxy-benzene

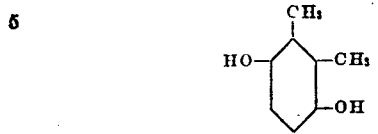

(10) 1:2-di-methyl-4:5-di-hydroxy-benzene

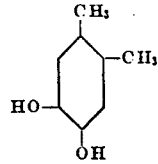

(11) 1:3-di-methyl-2:5-di-hydroxy-benzene

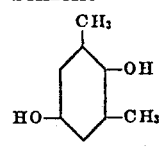

(12) 1:4-di-methyl-2:6-di-hydroxy-benzene

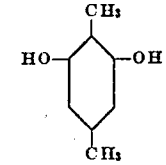

b—Di-ethyl-di-hydroxy-benzenes
  (13) 1:3-di-ethyl-2:5-di-hydroxy-benzene

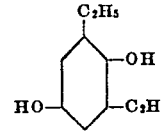

c—Methyl-ethyl-di-hydroxy-benzenes
  (14) 1-methyl-4-ethyl-2:5-di-hydroxy benzene

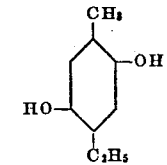

III—Di-alkyl-tri-hydroxy-benzenes
 a—Di-methyl-tri-hydroxy-benzenes
  (15) 1:3-di-methyl-2:4:5-tri-hydroxy-benzenes

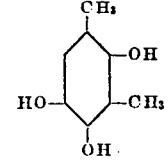

(16) 1:3-di-methyl-2:4:6-tri-hydroxy-benzenes

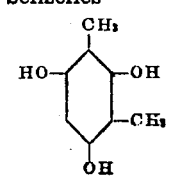

b—Di-ethyl-tri-hydroxy-benzenes
  (17) 1:3-di-ethyl-2:4:5-tri-hydroxy-benzene

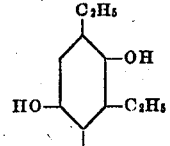

c—Methyl-ethyl-tri-hydroxy-benzenes
  (18) 1-methyl-3-ethyl-2:4:6-tri-hydroxy-benzene

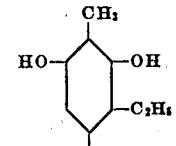

IV—Di-alkyl-tetra-hydroxy-benzenes
 a—Di-methyl-tetra-hydroxy-benzenes
  (19) 1:3-di-methyl-2:4:5:6-tetra-hydroxy-benzenes

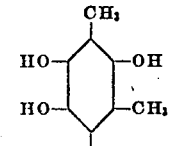

b—Di-ethyl-tetra-hydroxy-benzenes
  (20) 1:4-di-ethyl-2:3:5:6-tetra-hydroxy-benzene

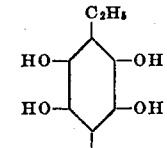

B—Di-alkyl-hydroxy-naphthalenes
 I—Di-alkyl-mono-hydroxy-naphthalenes
  a—Di-methyl-naphthols
   (21) 1:4-di-methyl-2-hydroxy-naphthalene

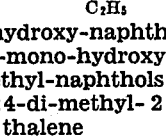

II—Di-alkyl-di-hydroxy-naphthalenes
  a—Di-methyl-di-hydroxy-naphthalenes
   (22) 2:6-di-methyl-1:5-di-hydroxy-naphthalene

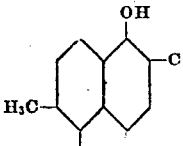

C—Di-alkyl-hydroxy-anthracenes
 I—Di-alkyl-mono-hydroxy-anthracenes
  a—Di-methyl-anthrols
   (23) 2:4-di-methyl-1-hydroxy-anthracene

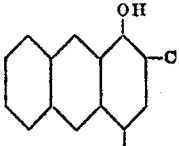

Tri-alkyl-hydroxy-aryl-compounds

A—Tri-alkyl-hydroxy-benzenes
I—Tri-alkyl-mono-hydroxy-benzenes
a—Tri-methyl-mono-hydroxy-benzenes
(24) 1:2:3-tri-methyl-5-hydroxy-benzene

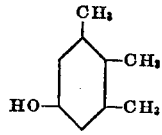

(25) 1:2:4-tri-methyl-5-hydroxy-benzene

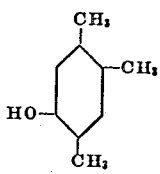

(26) 1:3:5-tri-methyl-2-hydroxy-benzene

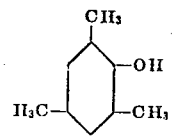

II—Tri-alkyl-di-hydroxy-benzenes
a—Tri-methyl-di-hydroxy-benzenes
(27) 1:2:3-tri-methyl-4:6-di-hydroxy-benzene

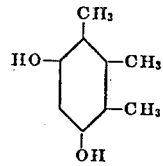

(28) 1:2:4-tri-methyl-3:5-di-hydroxy-benzene

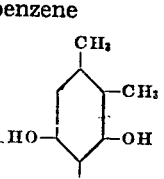

(29) 1:3:5-tri-methyl-2:4-di-hydroxy-benzene

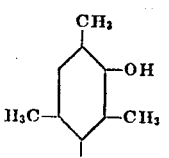

III—Tri-alkyl-tri-hydroxy-benzenes
a—Tri-methyl-tri-hydroxy-benzenes
(30) 1:3:5-tri-methyl-2:4:6-tri-hydroxy-benzene

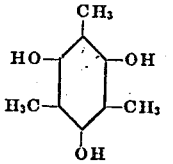

Tetra-alkyl-hydroxy-aryl-compounds

A—Tetra-alkyl-hydroxy-benzenes
I—Tetra-alkyl-mono-hydroxy-benzenes
a—Tetra-Methyl-Mono-hydroxy-benzene
(31) 2:3:4:5-tetra-methyl-1-hydroxy-benzene

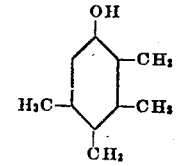

b—Tetra-ethyl-mono-hydroxy-benzene
(32) 2:3:4:5-tetra-ethyl-1-hydroxy-benzene

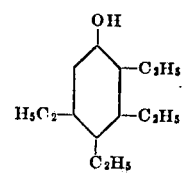

c—Di-methyl-di-ethyl-mono-hydroxy-benzenes
(33) 3:5-di-methyl-2:6-di-ethyl-1-hydroxy-benzene

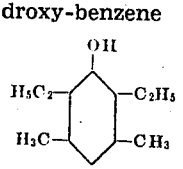

II—Tetra-alkyl-di-hydroxy-benzene
a—Tetra-methyl-di-hydroxy-benzenes
(34) 1:3:5:6-tetra-methyl-2:4-hydroxy-benzene

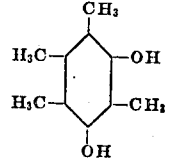

(35) 2:3:5:6-tetra-methyl-1:4-hydroxy-benzene

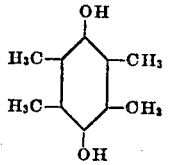

Penta-alkyl-hydroxy-aryl-compounds

A—Penta-alkyl-hydroxy-benzenes
I—Penta-alkyl-mono-hydroxy-benzene
a—Penta-Methyl-mono-hydroxy-benzene
(36) 1:2:3:4:5-penta-methyl-6-hydroxy-benzene

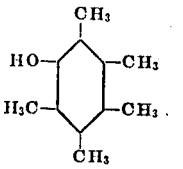

It is to be understood that other isomers and homologues in the classes mentioned above may be used. In certain cases it has been found advantageous to use two or more of the specific compounds covered by this invention. It will be appreciated that the examples outlined above and the specific compounds mentioned are given merely for the purpose of illustrating and not for limiting, the invention.

The materials used herein seem by virtue of their anti-oxidizing properties to inhibit and check the formation of organic peroxides which catalyze gum formation. By checking this catalysis, it is possible to inhibit a large portion of the undesirable gum.

These stabilizers possess an advantage which numerous stabilizers now on the market do not have and that is miscibility with hydrocarbon compounds in all desired proportions. They impart no color to colorless oils and they disperse rapidly when added to the material to be stabilized. Furthermore, some of these compounds, for example, the xylenols, prevent discoloration and cloud formation when the oils are exposed to light. They can be made in quantity at low cost.

Obviously this invention is of great importance in freeing internal combustion engines from the annoyance and improper functioning due to the deposition of gum in the fuel containers or fuel systems.

As many apparently widely different embodiments of this invention may be made without departing from the spirit and scope thereof, it is to be understood that we do not limit ourselves to the specific embodiments thereof except as defined in the appended claims.

We claim:

1. Motor fuel comprising cracked hydrocarbon spirits normally tendency to form gummy substances and containing a xylenol having at least one methyl group in one of the positions ortho and para to the hydroxyl group in an amount sufficient to retard the formation of the gummy substances.

2. Motor-benzol comprising cracked hydrocarbon spirits normally tending to form gummy substances and containing a xylenol having at least one methyl group in one of the positions ortho and para to the hydroxyl group in an amount sufficient to retard the formation of the gummy substances.

3. Motor fuel comprising cracked hydrocarbon spirits normally tending to form gummy substances and containing a mixture of xylenols in an amount sufficient to retard the formation of the gummy substances.

4. Motor-benzol comprising cracked hydrocarbon spirits normally tending to form gummy substances and containing a mixture of xylenols in an amount sufficient to retard the formation of the gummy substances.

5. Motor fuel comprising cracked hydrocarbon spirits normally tending to form gummy substances and containing 4-hydroxy-1:3-di-methyl-benzene in an amount sufficient to retard the formation of the gummy substances.

6. Motor-benzol comprising cracked hydrocarbon spirits normally tending to form gummy substances and containing 4-hydroxy-1:3-di-methyl-benzene in an amount sufficient to retard the formation of the gummy substances.

7. Motor fuel comprising cracked hydrocarbon spirits normally tending to form gummy substances and containing 2-hydroxy-1:3-di-methyl-benzene in an amount sufficient to retard the formation of the gummy substances.

8. Motor-benzol comprising cracked hydrocarbon spirits normally tending to form gummy substances and containing 2-hydroxy-1:3-di-methyl-benzene in an amount sufficient to retard the formation of the gummy substances.

9. Motor fuel comprising cracked hydrocarbon spirits normally tending to form gummy substances and containing 4-hydroxy-1:2-di-methyl-benzene in an amount sufficient to retard the formation of the gummy substances.

10. Motor-benzol comprising cracked hydrocarbon spirits normally tending to form gummy substances and containing 4-hydroxy-1:2-di-methyl-benzene in an amount sufficient to retard the formation of the gummy substances.

11. Cracked gasoline normally tending to form gummy substances and containing a xylenol having at least one methyl group in one of the positions ortho and para to the hydroxyl group in an amount sufficient to retard the formation of the gummy substances.

12. Cracked gasoline normally tending to form gummy substances and containing a mixture of xylenols in an amount sufficient to retard the formation of the gummy substances.

13. Cracked gasoline normally tending to form gummy substances and containing 4-hydroxy-1:3-di-methyl-benzene in an amount sufficient to retard the formation of the gummy substances.

14. Cracked gasoline normally tending to form gummy substances and containing 2-hydroxy-1:3-di-methyl-benzene in an amount sufficient to retard the formation of the gummy substances.

15. Cracked gasoline normally tending to form gummy substances and containing 4-hydroxy-1:2-di-methyl-benzene in an amount sufficient to retard the formation of the gummy substances.

FREDERICK B. DOWNING.
HERBERT W. WALKER.

CERTIFICATE OF CORRECTION.

Patent No. 1,945,521.   February 6, 1934.

FREDERICK B. DOWNING, ET AL.

It is hereby certified that error appears in the printed specification of the above numbered patent requiring correction as follows: Page 1, line 59, before "gasoline" insert the word as; page 5, line 37, claim 1, for "tendency" read tending; and that the said Letters Patent should be read with these corrections therein that the same may conform to the record of the case in the Patent Office. Signed and sealed this 20th day of March, A. D. 1934.